Dec. 17, 1968  W. P. McILRATH ET AL  3,416,417
VIBRATORY COMPACTOR

Filed Aug. 1, 1966  3 Sheets-Sheet 1

Inventors
WILLIAM P. McILRATH
CHRIS STOUGAARD
By Hofgren, Wegner,
Allen, Stellman & McCord Attys

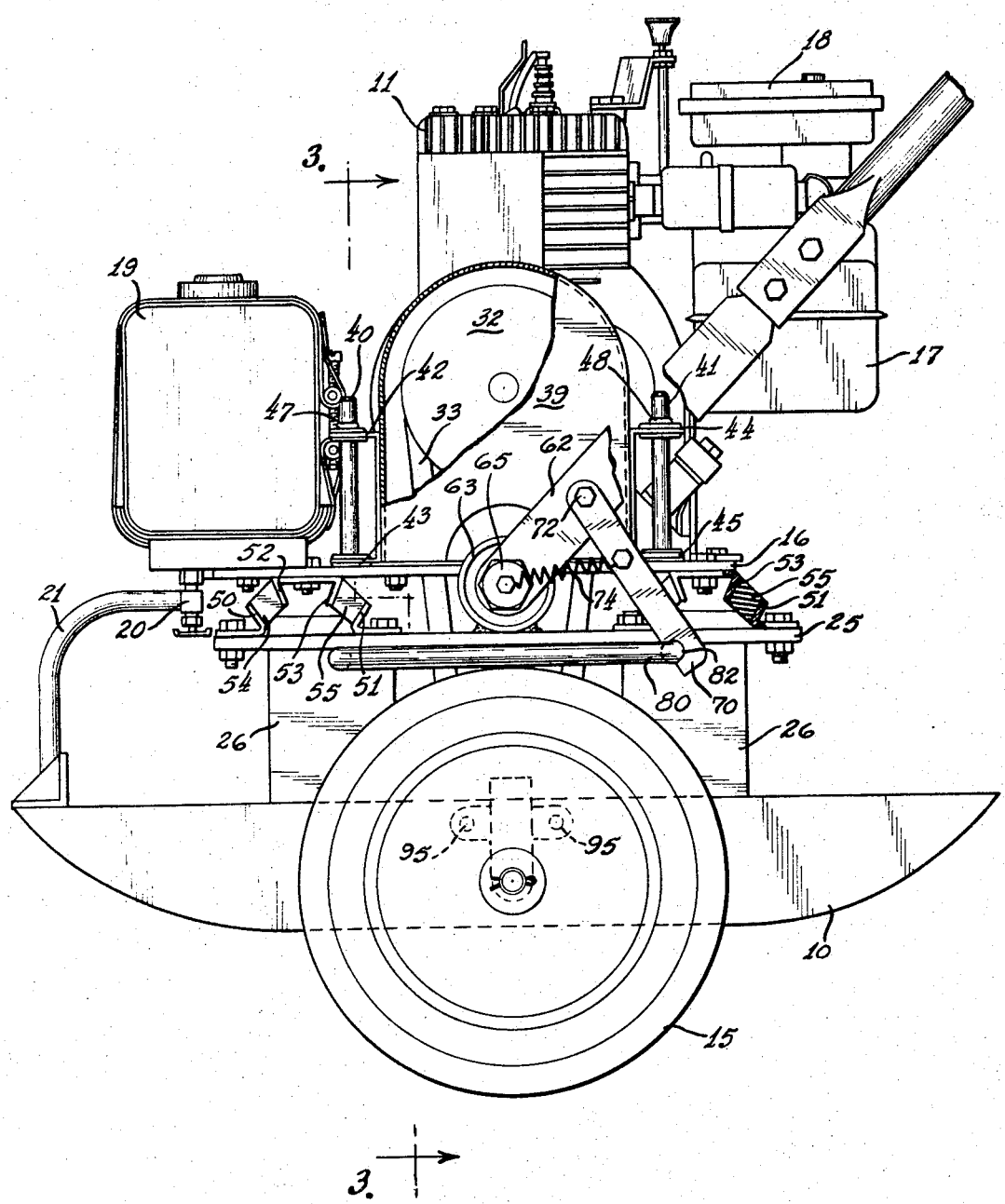

United States Patent Office 3,416,417
Patented Dec. 17, 1968

3,416,417
VIBRATORY COMPACTOR
William P. McIlrath and Chris Stougaard, Racine, Wis., assignors to Racine Hydraulics & Machinery, Inc., a corporation of Wisconsin
Filed Aug. 1, 1966, Ser. No. 569,449
5 Claims. (Cl. 94—48)

ABSTRACT OF THE DISCLOSURE

A plate type vibratory compactor having a ground compacting plate which is vibrated to accomplish compacting and wherein the unit can be rendered readily portable by quick attachable wheels, with the wheels being carried by mounting members and the mounting members coacting with the frame of the compactor to provide interengaging pin mounting members and abutment members to facilitate attachment of the wheels to the frame and retention thereof.

---

This invention relates to plate type vibratory compactors and, more particularly, to such a compactor having improved vibration and shock isolating structure, improved assembly of components, and quick attachable wheels and guiding structure for portability.

Plate type vibratory compactors are generally known in which a prime mover drives suitable mechanism to impart vibrations to a ground compacting plate. In such devices, various steps have been taken in the past to reduce the transmission of vibration to the prime mover in order to increase the useful life thereof and also to decrease the vibrations to a guiding handle, whereby an operator is not fatigued in holding the handle for guiding the compactor during use thereof.

An object of this invention is to provide a new and improved plate type vibratory compactor providing new and improved results over the devices previously known.

A further object of this invention is to provide a plate type vibratory compactor in which handle means are substantially isolated from vibrations of the compactor while guiding the device over the ground during use thereof and wherein the unit can be rendered readily portable by quick attachable wheels and the use of means for rigidifying the mounting of handle means whereby the handle means can be used for accurate steering of the unit while supported by the ground-engaging wheels.

Still another object of the invention is to provide a plate type vibratory compactor in which the prime mover is isolated from the vibrations by means of isolation mountings which obtain the maximum results from isolation material, such as rubber, by placing the rubber under loading primarily in shear to obtain superior vibration isolation with the loading of the rubber being partly in compression for absorption of shock.

An additional object of the invention is to provide a plate type vibratory compactor in which the plate is vibrated by means on a rotatable shaft with a drive train including a drive belt for the shaft and a cover and guard for the belt which is securely held in position even during operation of the compactor when vibrations are encountered without any attaching structure requiring the use of tools whereby the cover can be easily removed for access to the drive belt when required.

Further objects and advantages will become apparent from the following detailed description taken in connection with the accompanying drawings in which:

FIG. 2 is a side elevational view of the structure shown in FIG. 1, looking toward the back side thereof in FIG. 1 and with parts broken away;

Figure 1:
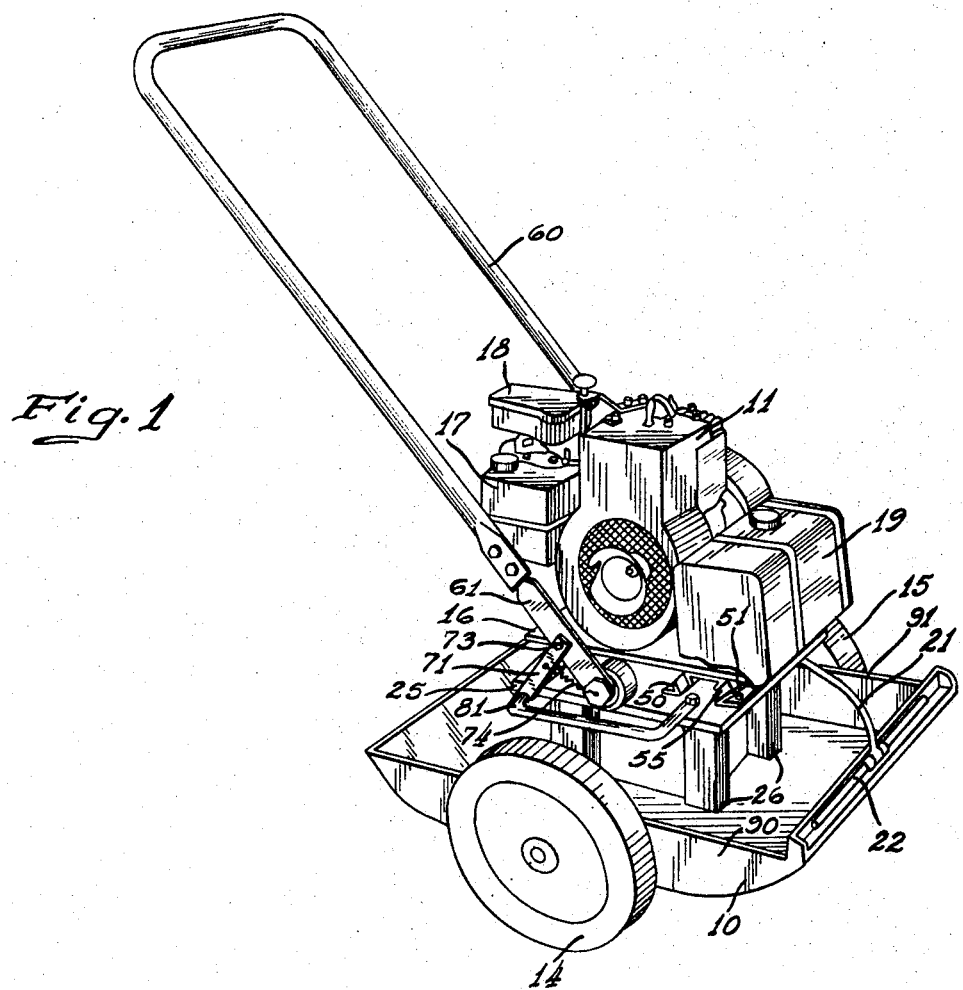
FIG. 1 is a perspective view of the plate type vibratory compactor, with the quick attachable wheels shown connected thereto and the handle means in locked position, for transporting of the unit.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The plate type vibratory compactor is shown generally in FIGS. 1 and 2 and includes a vibratory plate 10 which is caused to vibrate during operation by a prime mover in the form of an internal combustion engine 11 disposed above the plate. During compacting operation, the plate 10 is in engagement with the ground or other material to be compacted. However, as shown in the drawing, the unit is positioned for transport, with a pair of wheels 14 and 15 connected to the unit to support the plate at a level above the ground.

A first frame plate 16 mounts the engine 11 and associated structure, such as gas tank 17 and air filter 18, and optionally can mount a tank 19 for water which, through suitable connections including an on-off valve 20 and a line 21, supplies water to a spray pipe 22 at the forward edge of the plate 10.

Disposed beneath the engine mounting frame plate 16 is a frame plate 25 to which the vibratory plate 10 is connected through a series of interconnecting blocks 26 which are welded at their tops and bottoms to the frame plate 25 and vibratory plate 10, respectively. The frame plate 25 also has a pair of spaced-apart, depending, bearing mountings, one of which is shown at 30 in FIG. 3, for rotatably mounting a shaft 31 having an eccentric (not shown) located centrally of the ends thereof which, as well-known in the art, is caused to impart vibrations to the plate 10 during rotation of the shaft 31. The shaft 31 is caused to rotate by a drive train driven by the engine 11, including a drive pulley 32 (FIG. 2) about which a driving belt 33 extends and passes downwardly about a driven pulley 34 connected to the shaft 31, with the belt 33 extending through elongate slots 35 and 36 in the frame plates 16 and 25, respectively. In order to protect the user of the compactor from contact with the travelling belt 33, a belt guard and cover 38 is fitted over the belt and drive pulley 32 and on top of the engine mounting frame plate 16 to enclose the upper part of the belt. This cover has an inverted U-shaped side wall and a front wall 39 spanning the side wall.

Figure 3:
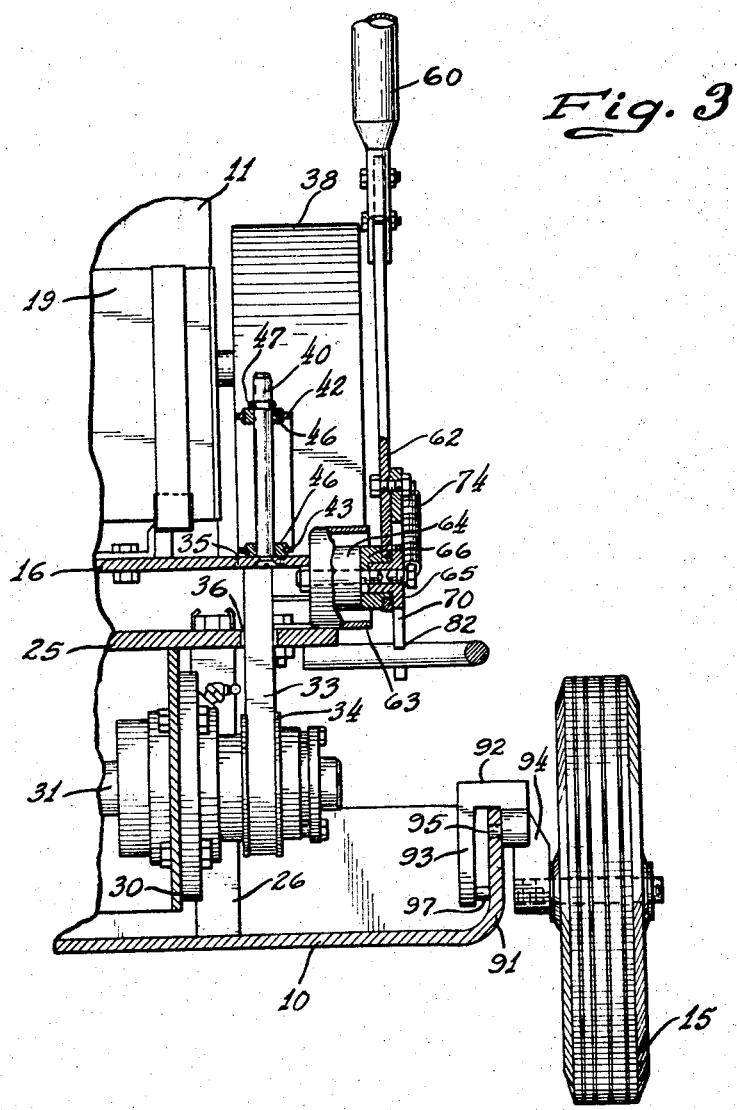
FIG. 3 is a vertical section, taken generally along the line 3—3 in FIG. 2.

An important feature of the invention is that this belt guard will remain in place and can be simply removed without requiring any tools. The cover 38 is mounted on a pair of upstanding, spaced-apart posts 40 and 41 secured to the upper side of the engine mounting plate 16 by means including two pairs of spaced ears having apertures therein with the ears 42 and 43 being associated with the post 40 and the ears 44 and 45 being associated with the post 41. Each of these ears has a rubber grommet 46 positioned therein to frictionally engage the associated post whereby, as shown in FIGS. 2 and 3, the cover is supported on the posts and frictionally held thereon, while the cover can be removed by lifting the ears and grommets off the posts. The retention of the cover can be made even more effective by the use of a pair of O-rings 47 and 48 fitted in grooves at the upper ends of the posts 40 and 41, respectively, which can easily be removed when it is desired to remove the belt cover.

It is important to isolate the engine and associated structure from vibrations of the vibratory plate 10 as much as possible. This is done by isolation mountings positioned both at the front and rear of the compactor. Each of these mountings is of the same construction and only one need be described in detail. The mounting embodies a pair of inclined flanges 50 and 51 extending transversely of the compactor and secured to the upper side of the plate mounting frame 25 and in spaced, opposed relation to a pair of downwardly inclined flanges 52 and 53 formed in a plate extending transversely on the under side of the engine mounting frame 16. Between the opposed pairs of flanges 50–52 and 51–53 are a pair of rubber strips 54 and 55 which, because of the angularity of the flanges, are caused to be loaded primarily in shear to obtain maximum vibration isolation and loaded partly in compression for absorption of shock.

Handle means are provided for steering the compactor, both in compacting operation and also when the unit is made portable by addition of the wheels 14 and 15. This handle means comprises a U-shaped handle 60 having lower ends 61 and 62, each mounted to the compactor and, more particularly, to the plate mounting frame 25 by means of isolation mountings. The mounting for handle end 62 is shown particularly in FIGS. 2 and 3 in which a cup-shaped member 63 is welded to the upper side of the frame 25 and has a rubber block 64 disposed therein and attached by a suitable threaded connection to the base of the cup. A headed member 65 is threaded onto a bolt extending from the rubber block 64 and the end 62 of the handle fits behind the head and against a washer 66 fitted on the headed member, whereby the handle is free to pivot from the position shown in FIG. 1 in a clockwise direction when it is desired to guide the compactor in the opposite direction during compacting. With this construction, the handle 60 is connected to the frame only through the rubber blocks 64 at opposite sides of the machine, whereby during compacting operation the handle is substantially isolated from vibration.

As previously mentioned, the compactor can readily be made portable for transportation from one location to another by means of quick attachable ground-engaging wheels and by rigidifying the handle structure to the frame of the compactor. The rigidification of the handle structure is obtained by use of a pair of pivoted arms 70 and 71 which are pivoted to the handle ends near the ends thereof, as indicated at 72 and 73, respectively. A tension spring 74 connects between the arm intermediate the ends thereof and the pivot axis of the handle to normally urge the associated arm to lie closely adjacent to the handle ends. However, as shown in FIGS. 1 and 2, the arms can engage rod-shaped extensions 80 and 81 of the plate mounting frame 25 by a notch 82 formed in the lower end of the arm engaging an extension. The arms are held in engagement with the rod-shaped extensions by the force of the springs 74. In normal operation, the isolation mountings, including the rubber block 64 cause the handle 60 to be quite flexible relative to the frame, which does not facilitate simple steering of the compactor. However, when the unit is made portable, the arms 70 and 71 can be brought into operation to rigidify the connection of the handle 60 to the frame to provide accurate guiding of the compactor.

Figure 4:
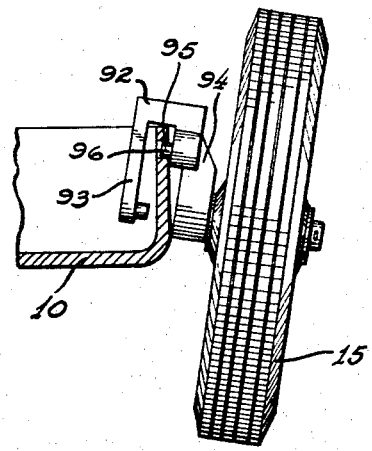
FIG. 4 is a fragmentary view of the lower right-hand part of FIG. 3, showing one of the ground-engaging wheels in a partly assembled condition to the compactor.

The quick attachable ground-engaging wheels 14 and 15 are connectable to upstanding side flanges 90 and 91 of the vibratory plate 10, with each of the wheels and associated structure being identical, so that the structure associated with the wheel 15 will only be described. There is a base 92 of a generally U-shape having legs 93 and 94, with the wheel 15 being rotatably mounted on the leg 94. As shown in FIG. 3, the base 92 spans the upstanding side flange 91 of the plate 10, with a pair of horizontally-spaced pins 95 on leg 94 engageable from the outside in a pair of horizontally-spaced openings 96 in the plate flange 91. The base leg 93 has a single, central pin 97 extending outwardly therefrom to engage the inner surface of the plate flange 91, as shown in FIG. 3 and at a level beneath the pins 95 to resist upward forces on the wheel tending to pull the pins 95 from the flange openings 96. In attachment or detachment of the wheels, it can easily be accomplished, as shown in FIG. 4, by slight tilting of the base 92 and positioning the base over the flange, with insertion of the pins 95 in the openings 96 and, then, as the base is straightened the pin 97 is brought into contact with the inner face of the flange and weight supported by the wheels maintains this relation. Removal of a wheel need merely reverse the foregoing operation.

With the construction described herein, it is possible to render the compactor readily portable by locking the handle structure and also providing ground-engaging wheels for transport. Additionally, it is possible to quickly obtain access to the drive belt for repair or replacement and harmful vibration is reduced, both by a new-type of isolation mounting for the engine frame relative to the vibratory plate frame and by isolation mountings of the handles, which can be simply changed to a rigid connection by use of the pivoted latching arms.

We claim:

1. A plate type vibratory compactor having a frame mounting a plate with upstanding side flanges, handle means for guiding said plate, and means rendering said compactor portable comprising a pair of detachable wheels, each of said wheels having a base on which said wheel rotates, a pair of spaced-apart openings in each of said side flanges, said bases each having a pair of spaced legs with a pair of pins on one leg engageable in said openings in one flange from the outside of the flanges and a pin on the other leg to engage the inside of the plate flange to resist pivoting movement of the base about the plate flange in one direction when weight is placed on the wheels while permitting easy disassembly of the wheels from the plate by pivoting in the opposite direction.

2. A compactor as defined in claim 1 wherein said handle means are resiliently connected to said frame, and means for connecting the handle means rigidly to said frame for steering thereof when said wheels are attached to the frame.

3. A plate type vibratory compactor comprising an engine mounting frame, a plate mounting frame positioned beneath the engine mounting frame, an isolation mounting connecting said frames together, a vibratory plate connected to its mounting frame, means for causing vibration of said plate, handle means for guiding said compactor, resilient means mounting said handle means onto one of said frames to reduce transmission of vibration to said handle means, means for rigidly connecting said handle means to said one frame for transport of the compactor including a latch arm pivotally mounted on said handle means and having a notch positioned for selective engagement with said one frame, and means for yieldably holding said latch arm engaged with said one frame including a tension spring connected between said latch arm and a stud on the handle means lying in the path of said latch arm whereby when the latch arm is not in use it is positioned adjacent the handle means and against the stud in an out-of-the-way position.

4. A compactor as defined in claim 3 wherein said one frame is the plate mounting frame.

5. A plate type vibratory compactor comprising an engine mounting frame, a plate mounting frame positioned beneath the engine mounting frame, an isolation mounting connecting said frames together, a vibratory plate connected to its mounting frame, means for causing vibration of said plate, handle means for guiding said compactor, resilient means mounting said handle means onto one of said frames to reduce transmission of vibration to said handle means, means for rigidly connecting said handle means to said one frame for transport of the compactor, a pair of detachable wheels to facilitate transport of the compactor, each of said wheels having a base on which said wheel rotates, and a quick connection structure for mounting a wheel to said plate including an upturned side flange on said plate, said base having a U-shaped portion defining a pair of legs to fit over said flange, a pair of pins and a pair of pin-receiving openings with one pair on said side flange and the other on one of said base legs, the pins being insertable in the openings from the outside of the flange and a pin on the other leg to engage against the inside of the plate flange at a level beneath said openings whereby weight carried by the wheel causes the base to remain associated with the plate.

References Cited

UNITED STATES PATENTS

| | | | |
|---|---|---|---|
| 2,209,656 | 7/1940 | Mall | 94—48 |
| 2,856,828 | 10/1958 | Brown et al. | 94—48 |
| 2,888,863 | 6/1959 | Eisenbeis | 94—45 |
| 3,279,338 | 10/1966 | Briggs et al. | 94—48 |
| 3,314,341 | 4/1967 | Schulin et al. | 94—48 |
| 3,336,848 | 8/1967 | Moir | 94—48 |

OTHER REFERENCES

Roads and Streets, page 161, May 1961.

JACOB L. NACKENOFF, *Primary Examiner.*